Feb. 20, 1962 C. C. McGEE 3,021,619
ATTACHMENT FOR BULLDOZER OR TRACTOR
Filed Sept. 5, 1958
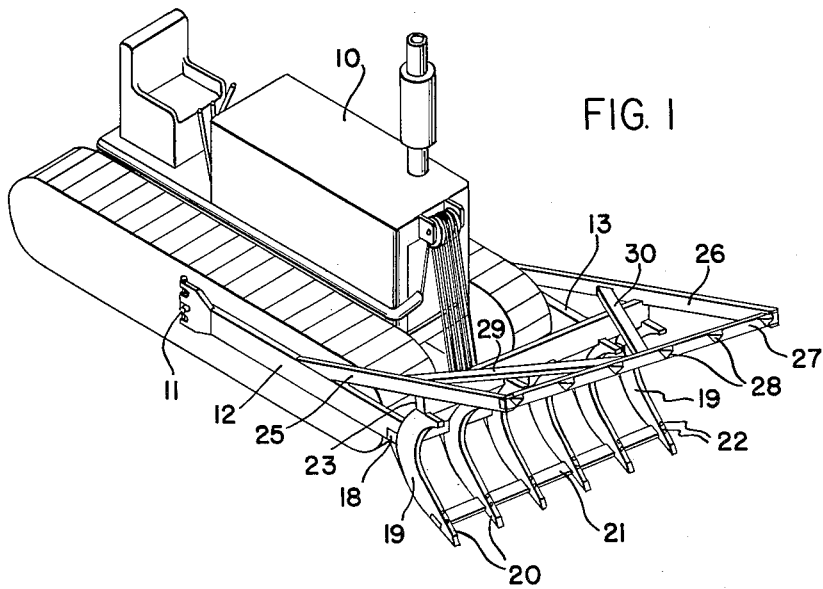
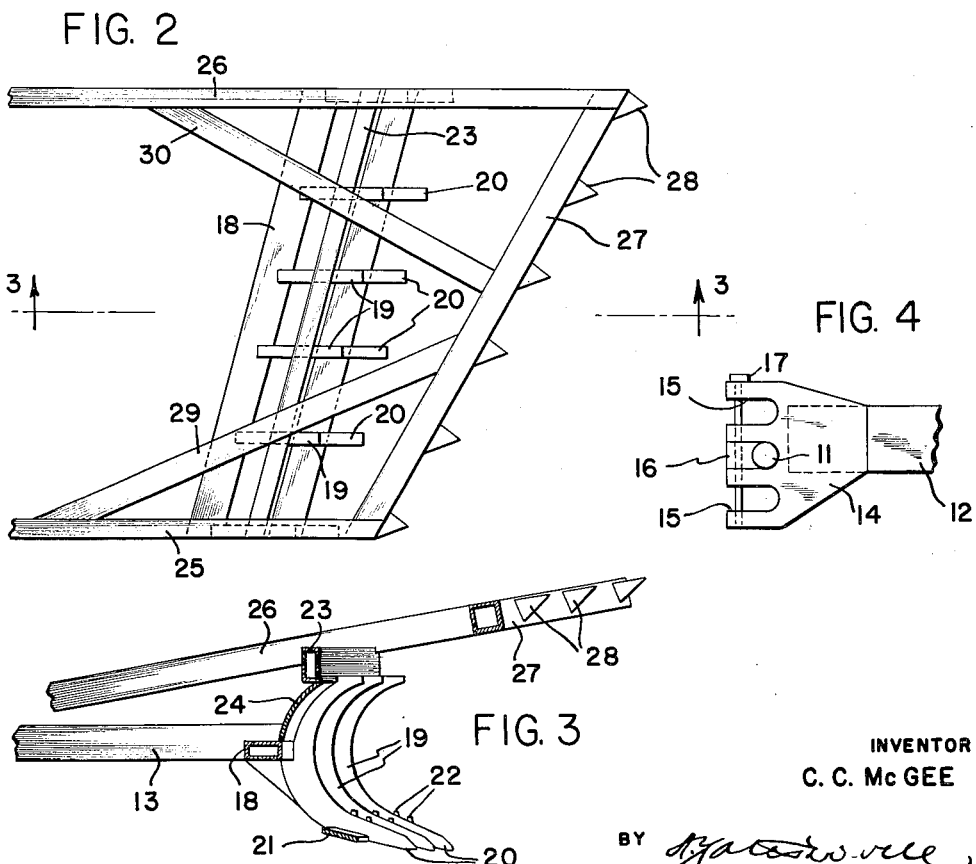
INVENTOR
C. C. McGEE
BY *[signature]*
ATTORNEY

United States Patent Office 3,021,619
Patented Feb. 20, 1962

3,021,619
ATTACHMENT FOR BULLDOZER OR TRACTOR
Calvin C. McGee, 652 Sweetwater Ave., Florence, Ala.
Filed Sept. 5, 1958, Ser. No. 759,336
3 Claims. (Cl. 37—2)

This invention relates to the clearing of the land of trees and other growth or other obstructions and to apparatus and equipment by which the clearing is accomplished, including the power equipment such as bulldozers and other earthworking equipment used in the clearing of the land.

The invention is concerned primarily with an attachment for the front of a bulldozer for use in clearing obstacles such as trees, brush, rocks and the like from land by the application of pressure more or less in a generally horizontal direction to uproot or dislodge the same and deposit the debris in windrows or piles for burning or removal.

The removal of trees has involved the use of sturdy power equipment and at times has resulted in injury to operators and damage to equipment occasioned by a tree falling rearwardly on the operator and on the machine and otherwise has lacked the structure and operation to accomplish a desired result without difficulty and without the necessity of the bulldozer frequently having to be reversed during the clearing operation. Also bulldozers have been constructed so that they accumulate earth which prevents further progress of the machine and on occasion it has been necessary to perform multiple operations in order to remove a tree or the like obstruction.

It is an object of the invention to overcome the difficulties enumerated and to provide an attachment for a bulldozer by which a tree can be pushed from an upright position to one of an angle of approximately 45° and then laterally or sidewise to substantially horizontal position all during the forward progress of the machine.

Another object of the invention is to provide an attachment for a bulldozer which will first engage a tree and push it from an upright position to one at an angle of 45°, then sidewise to a substantially horizontal position and force the teeth or parallel earth engaging members beneath the roots of the tree to remove the same from the ground at a substantial saving in time and effort as well as wear and tear on equipment and on the operator.

Another object of the invention is to provide an attachment for a bulldozer which can be used for removing trees, stumps, undergrowth, roots, rocks, and other obstructions and deposite them in windrows or in piles and which attachment can be adjusted in height depending upon the work to be accomplished and as well as an attachment which, with minimum effort and expense, can be added to a tractor or substituted for the conventional bulldozer blade.

A further object of the invention is to provide a relatively simple and inexpensive attachment for a tractor or bulldozer which can be employed as a subsoiler, for plowing or for digging in the soil, for mixing sand and gravel and for breaking up old structures, roadways or the like and in a minimum of time and with a minimum of effort and expense.

Other objects and advantages of the invention will be apparent from the following description taken in conjunction with the drawing wherein:

FIG. 1 is a perspective view illustrating one application of the invention;
FIG. 2, a top plan view;
FIG. 3, a section on the line 3—3 of FIG. 2; and
FIG. 4, a fragmentary detail of the attaching means.

Briefly stated, the invention is an attachment for a tractor or bulldozer for application on the front thereof for a particular type of work such as clearing land where it is necessary to push over, uproot and move into windrows or piles trees, brush, rocks and other obstructions. The attachment comprises a series of spaced substantially parallel forwardly curved earth engaging members or plows above and forwardly of which is disposed an angularly disposed pusher bar with spaced projections between which trees or the like are adapted to be engaged until they are disposed substantially at an angle of 45° whereupon they will become disengaged so that they may be forced laterally of the path of movement and the roots of such trees will be engaged and uprooted by the spaced teeth or members. Beneath the pusher bar is a cross plate disposed in a position to protect the radiator of the tractor.

With continued reference to the drawing, a bulldozer 10 is provided having a stubshaft 11 projecting from each side thereof. A pair of side arms 12 and 13 are connected to the stubshaft 11 by an adjustable connecting plate 14 having a series of slots 15 for the reception of such stubshaft which in turn is pivotally held in position by a block 16 which fits into a slot 15 and is held therein by a pin 17 which extends through the end portion of the plate 14, slots 15 and block 16.

The opposite ends of the side arms 12 and 13 are connected by a lower tie bar 18 which may be mitered or fitted into the side arms 12 and 13 and attached thereto by welding or other suitable means. A series of spaced generally crescent shaped teeth 19 are welded or otherwise attached to the lower tie bar 18 and may have generally pointed lower ends 20 for penetrating the soil to reduce the same and to uproot or dislodge trees, brush, rocks or other obstructions.

The lower ends of the teeth are connected and supported by a cutter bar 21 attached thereto by bolts 22 and if desired the cutter 21 may have a sharpened leading edge to sever roots or growth and to push the same down and roll them to one side of the path of travel of the vehicle.

The upper ends of the teeth 19 are connected and reinforced by an upper tie bar 23 attached thereto by welding or other suitable means. A shield or mold board 24 is provided intermediate the lower tie bar 18 and the upper tie bar 23 and along adjacent teeth 19. Such mold board protects the radiator of the vehicle from objects which might pass between the teeth including broken limbs, branches, roots and other objects which might damage the radiator during the clearing process.

The shield or mold board 24 is rearwardly offset from the leading edge of the teeth 19 so that dirt and debris which may have been dislodged may pass between the mold board and the trunk of a tree.

The teeth 19 and the lower tie bar 18 and upper tie bar 23 preferably are disposed at an angle to the path of travel of the vehicle so that objects engaged by such teeth will be rolled to one side beyond the path of the vehicle.

A pair of angle bars forming struts 25 and 26 are welded or otherwise attached to the upper surfaces of the side bars 12 and 13 and such angle bars, supported by the upper tie bars 23, extend beyond the ends of the teeth 19. The bar 26 is somewhat longer than the bar 25 and the outer ends are connected by a pusher bar 27 on which are mounted a series of substantially equally spaced projections 28 between which the trunks of trees are adapted to be engaged and held against sidewise movement. The center of the pusher bar is reinforced by a pair of tubular support bars 29 and 30 which may be hollow for strength and lightness.

The pusher bar 27 is at a greater angle to the line of travel than the teeth 19 so that when a tree is engaged by the pusher bar 27 the projections 28 will engage the tree and prevent the tractor or bulldozer from moving sidewise from the path of travel. The tree thus engaged will be forced at an angle of approximately 45° to the path of the vehicle until it reaches an angle sufficient to become disengaged from the projections 28 whereupon the angular pusher bar 27 will slide along the tree trunk and force it sidewise. The teeth 19 also will engage the roots of the tree and the cutter bar 21 will sever the roots and allow the teeth 19 to uproot the tree. After the tree has fallen the continued forward motion of the vehicle will roll the tree to one side due to the angular relation of the teeth and the path of travel, avoiding the necessity of reversing the direction of movement of the tractor in order to push the tree from an opposite or different direction to clear it from the path of travel.

The land clearing attachment of the present invention may be adjusted as to height by any conventional means as for example by multiple pulleys as illustrated in FIG. 1 or by conventional hydraulic cylinders which would be attached one on each side to raise and lower the attachment.

The depth the teeth 19 penetrate the earth may be regulated by the position in which the arms 12 and 13 are mounted on the stubshaft 11. For deeper penetration the upper groove is employed, for normal penetration the center groove is used, and for shallow penetration the lower groove is used.

In the operation of the device the tractor or bulldozer is moved forwardly until pusher bar 27 engages the trunk of a tree between any two of the projections 28. Since the pusher bar is located on an angle to the direction of travel the tractor will have a tendency to slip or move sidewise away from the tree. When the trunk of the tree engages one or more of the projections a force will be exerted on the opposite side of the tree and the tendency to slip will be eliminated and the entire force of the tractor will be directed towards pushing the tree over into the path of travel of the tractor. Upon continued forward movement of the tractor the teeth 19 will engage the roots of the tree and the cutter bar 21 will sever such roots and allow the teeth 19 to uproot the tree. When the tree has assumed an angle of approximately 45° the projections 28 on the pusher bar will become disengaged whereupon the pusher bar 27 will exert both a horizontal and a sidewise thrust to cause the tree to fall to the side of the path of movement of the tractor. When the tree has been completely uprooted the root system and a portion of the trunk will remain in front of the tractor. As the tractor continues its forward motion the teeth 19 will impart a rolling tumbling action to the tree and will disengage a major portion of the earth clinging to the root system until the tree is rolled into a windrow beside the path of travel of the tractor.

It will be apparent from the foregoing that an attachment is provided for a tractor or bulldozer which is simple, easy to produce at small expense and the use of which does not require particular skill. Also with the device the desired work can be accomplished with maximum speed and efficiency and at a great saving of time and labor.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. An attachment for a tractor comprising a pair of side arms constructed for pivotal connection at their rear ends to the tractor, a lower tie bar connecting the front end portions of said side arms, a series of spaced generally crescent shaped teeth forming a row and attached along their convex surfaces and intermediate their ends to said lower tie bar so that their concave surfaces and their lower pointed ends are disposed forwardly, an upper tie bar uniting the upper end portions of said teeth, angle bars of unequal length extending across said upper tie bar wtih the rear end portions connected to said arms and their front end portions projecting forwardly of said upper tie bar, a pusher bar fixed to the ends of said angle bars and disposed at an angle to the path of movement of the tractor for engaging trees ahead of said teeth, a series of spaced angular projections mounted along said pusher bar between which the trunks of trees are adapted to be engaged and held against sidewise movement until said tree has been moved towards horizontal position sufficiently to permit clearance of said projections whereupon both a sidewise and a horizontal thrust will be imparted to said trees by said pusher bar, and said teeth will be engaged beneath the roots of the trees to forceably disengage them from their moorings and roll the trees to one side of the path of travel of the vehicle as it continues to move forward.

2. An attachment for a tractor comprising side arms for connection to the tractor, a tie bar connecting the front end portions of said side arms, a series of spaced teeth attached intermediate their ends to said tie bar, angle bars of unequal length extending across said tie bar and with their rear end portions connected to said arms and their front end portions projecting forwardly of said tie bar, a pusher bar fixed to the ends of said angle bars and disposed at an angle to the path of movement of the tractor for engaging trees ahead of said teeth, a series of spaced angular projections mounted along said pusher bar between which the trunks of trees are adapted to be engaged and held against sidewise movement until said trees have been moved towards horizontal position sufficiently to permit clearance of said projections whereupon both a sidewise and a horizontal thrust will be imparted to said trees by said pusher bar, said teeth being engageable with roots of the trees to forceably disengage them from their moorings and roll the trees to one side of the path of travel of the vehicle forming a windrow as it continues to move forwardly, and a cutter bar extending between and connecting said teeth adjacent the lower ends thereof.

3. Land clearing equipment for simultaneously uprooting trees and removing vegetation from the earth comprising a tractor, a pair of side arms projecting forwardly from said tractor, a main tie bar extending between said side arms and disposed at an angle to said side arms, a plurality of teeth mounted on said tie bar with each tooth extending substantially in alignment with the direction of movement of the tractor and with appreciable space between adjacent teeth, the plurality of teeth forming a row disposed at an angle to the direction of movement of the tractor, an upper tie bar connecting the upper ends of said teeth, a cutter bar extending between and connected to the teeth adjacent the lower ends thereof for maintaining the ends of the teeth in accurate spaced relation and serving to cut vegetation adjacent the lower ends of the teeth, a pair of angle bars of unequal length extending across said upper tie bar with their rear end portions connected to said arms and their front end portions projecting forwardly of said upper tie bar, a pusher bar extending between the forward ends of said angle bars and fixed thereto with said pusher bar being at an angle other than the angle formed by said main tie bar and row of teeth, a plurality of projections mounted on the forward edge of said pusher bar and engageable with a tree or other obstruction for forcing a tree in the direction of movement of the tractor and to cause the tree to fall to the side laterally and be pushed into a windrow at the trailing end of the row of teeth with the material tumbling between the teeth, the earth and the pusher bar to effectively remove the earth therefrom whereby the obstruction will be overturned and roll into a windrow substantially completely free of the earth and small stones.

References Cited in the file of this patent

UNITED STATES PATENTS

| | | |
|---|---|---|
| 2,633,164 | Kissner et al. | Mar. 31, 1953 |
| 2,735,197 | Struemph | Feb. 21, 1956 |

FOREIGN PATENTS

| | | |
|---|---|---|
| 556,333 | Great Britain | Sept. 30, 1943 |
| 144,135 | Australia | Nov. 7, 1951 |